Sept. 7, 1954     H. P. HODGMAN     2,688,524
DROP LEAF TABLE
Filed Nov. 29, 1952     5 Sheets-Sheet 4

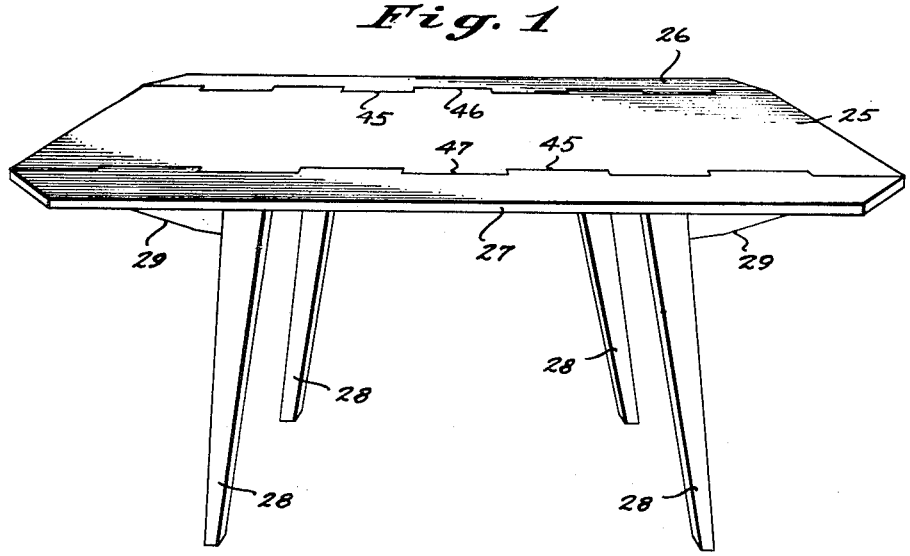
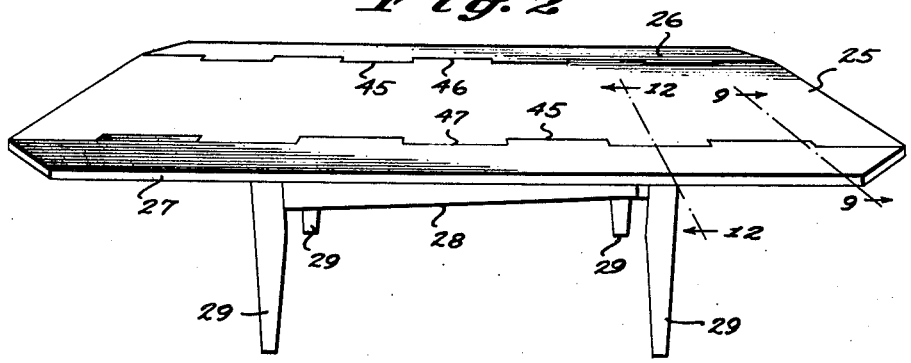
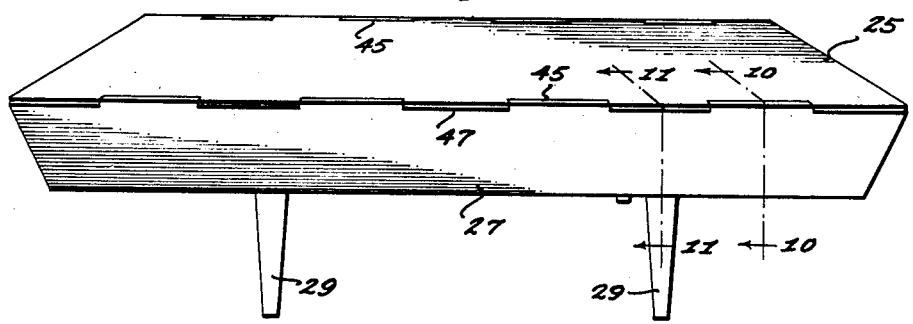
INVENTOR.
HOWARD P. HODGMAN
BY
Parrott & Richards
ATTORNEYS

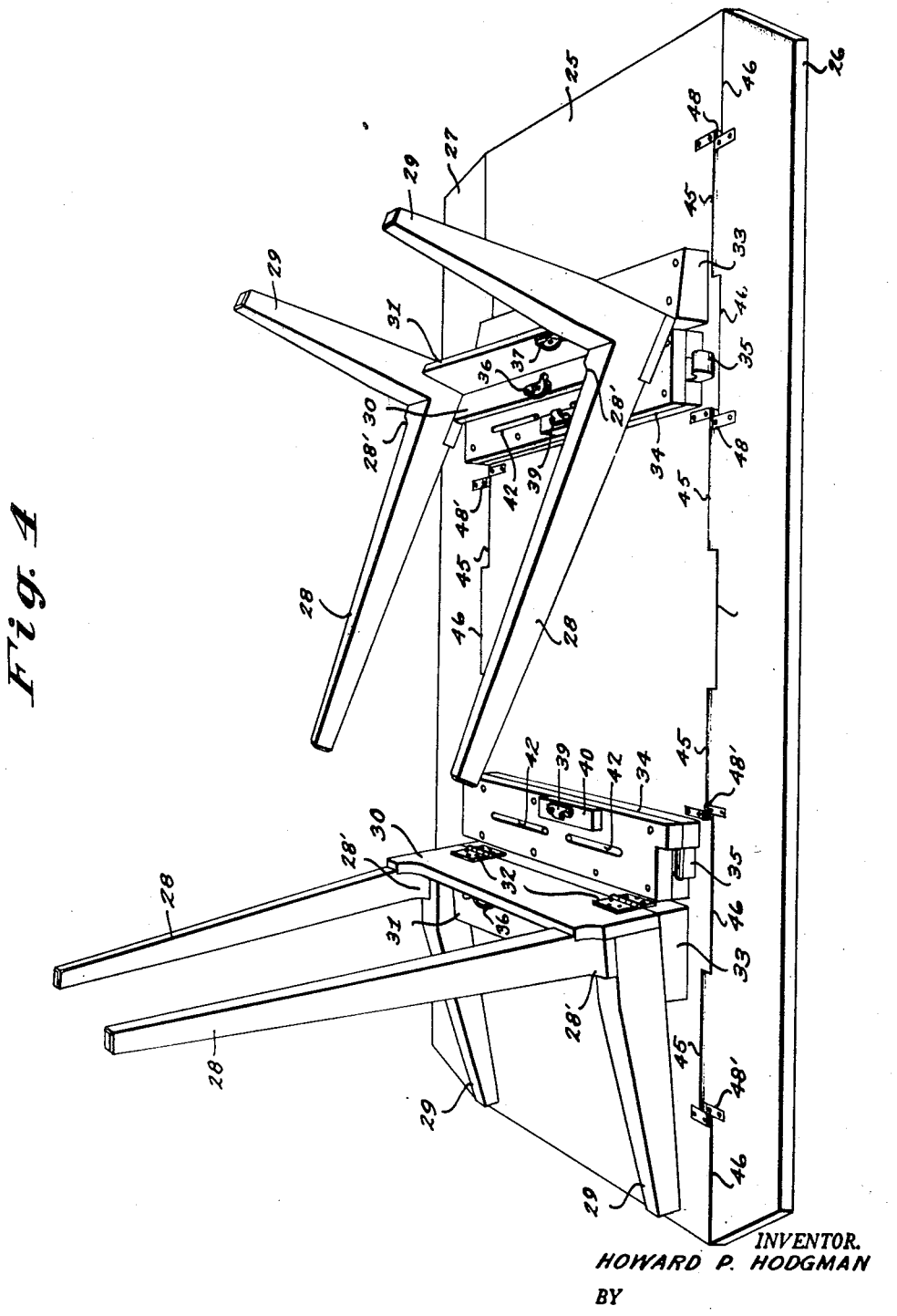

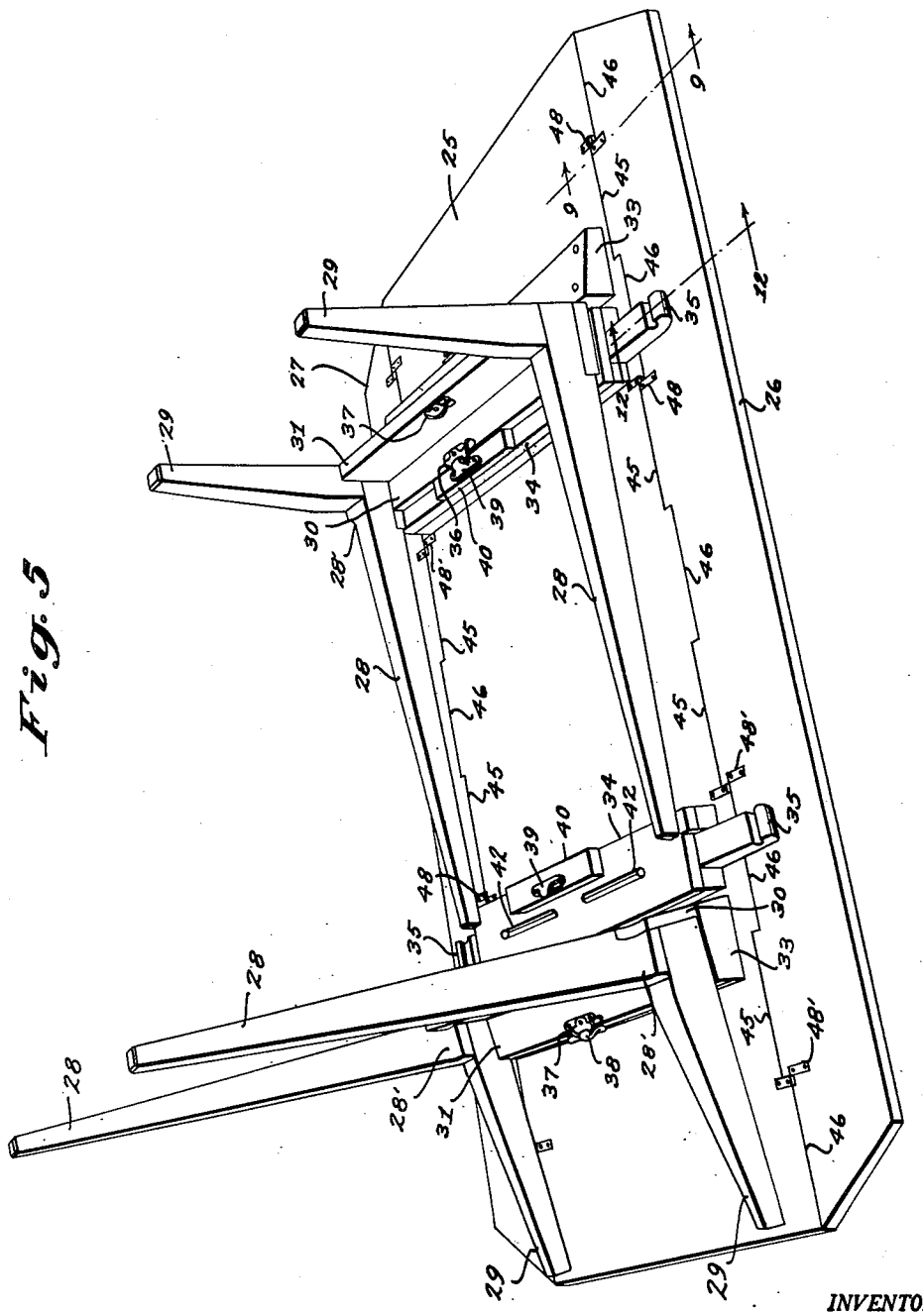

INVENTOR.
HOWARD P. HODGMAN
BY
Parrott & Richards
ATTORNEYS

Sept. 7, 1954 H. P. HODGMAN 2,688,524
DROP LEAF TABLE
Filed Nov. 29, 1952 5 Sheets-Sheet 5
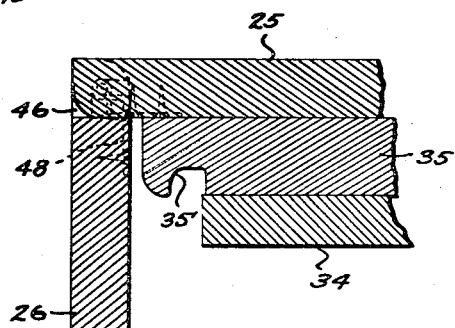
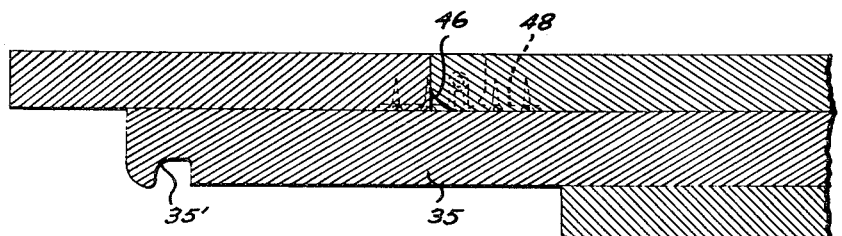
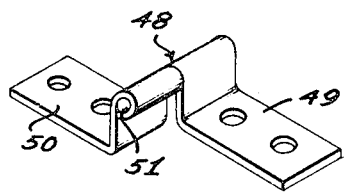
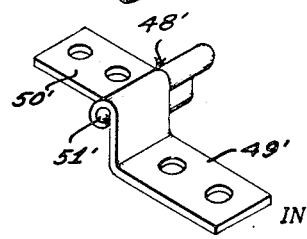
INVENTOR.
HOWARD P. HODGMAN
BY
Parrott & Richards
ATTORNEYS Patented Sept. 7, 1954

2,688,524

UNITED STATES PATENT OFFICE 2,688,524

DROP LEAF TABLE

Howard P. Hodgman, Morganton, N. C., assignor to Drexel Furniture Company, Drexel, N. C., a corporation of Delaware Application November 29, 1952, Serial No. 323,211

1 Claim. (Cl. 311—61)

This invention relates generally to table structures, and more particularly to a unique form of drop leaf table in which the drop leaves are mounted in an especially advantageous manner to form a continuous surface with the table top in raised position, and in which a selective leg structure is provided that allows the table to be converted to various forms for different purposes.

These and other features of the table structure of the present invention are described in further detail below in connection with the accompanying drawings, in which:

Fig. 1 is a perspective view of a drop leaf table embodying the present invention, the drop leaves being shown raised and the leg structure selectively arranged for a high table level;

Fig. 2 is a perspective view corresponding to Fig. 1, but showing the leg structure selectively arranged for a low table level;

Fig. 3 is a perspective view corresponding generally to Fig. 2, but showing the drop leaves in lowered position;

Fig. 4 is a perspective view showing the table structure as illustrated in Fig. 1 in inverted position, with the right hand supporting legs, as seen in Fig. 4, disposed intermediately between high and low position to illustrate the manner in which provision is made for selective arrangement of the supporting legs;

Fig. 5 is a further perspective view corresponding generally to Fig. 4, but showing the right hand supporting legs in low position for contrast with the left hand supporting legs that are in high position, and showing the drop leaf support slides extended;

Fig. 9 is a fragmentary sectional detail taken substantially on the line 9—9 in Fig. 2 or Fig. 5;

Fig. 10 is a fragmentary sectional detail taken substantially on the line 10—10 in Fig. 3;

Fig. 11 is a fragmentary sectional detail taken substantially on the line 11—11 in Fig. 3;

Fig. 12 is a fragmentary sectional detail taken substantially on the line 12—12 in Fig. 2 or Fig. 5;

Fig. 13 is a perspective view showing one hand of the hinges used for mounting the drop leaves; and Fig. 14 is a perspective view of the opposite hand of hinges from that shown in Fig. 13.

Referring now in detail to the drawings, and more particularly at first to Fig. 1, the table structure shown embodying the present invention comprises a fixed or main table top 25, having a drop leaf mounted at opposite edges thereof as at 26 and 27, and fitted with a supporting leg structure providing high level supporting legs 28 and low level supporting legs 29 for selective use.

Fig. 1 shows the drop leaves 26 and 27 raised and the high level legs 28 in supporting position, while Fig. 2 shows the low level legs 29 substituted in supporting position and Fig. 3 additionally shows the drop leaves 26 and 27 lowered.

Figure 7:
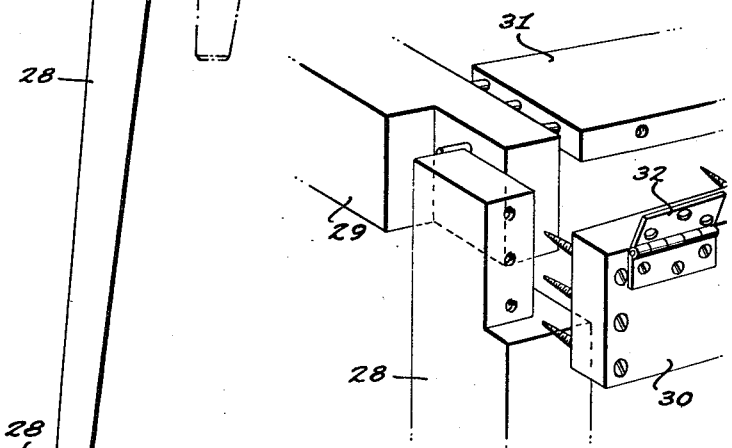
Fig. 7 is a fragmentary perspective detail illustrating the component structure of the supporting legs.

In Figs. 4 and 5, the table structure is shown inverted so as to show better the arrangement of the above mentioned supporting legs 28 and 29. As shown, these supporting legs 28 and 29 are arranged in units adjacent each end of the table top 25, with each unit including a pair of both the high level supporting legs 28 and the low level supporting legs 29 which are assembled at their top ends in substantially right angular relation and secured to framing pieces 30 and 32 (compare Fig. 7) so that the legs 28 and 29 of each pair are disposed in spaced relation to assume positions adjacent each side edge of the table top 25.

To attach the supporting leg units to the table top 25, the framing pieces 30 are fitted with hinges 32 which are secured to the under side of the table top 25 preferably through the intermediary of an anchor block member 33 so as to provide for accommodation of an adjacent anchor block member 34 in which slide members 35 for supporting the drop leaves 26 and 27 may be housed, as will be described more in detail presently.

The above noted hinged mounting arrangement of the supporting leg units on the anchor block 33 allows the previously mentioned selective disposition of these units for supporting the table top 25 at either a high level or a low level, one of these units being shown in Fig. 4 (at the right) with the high level supporting legs 28 and low level supporting legs 29, that form arm portions of the unit so to speak, disposed intermediately in the course of pivoting between high and low position, while Fig. 5 shows the right hand unit secured in low position with the left hand unit remaining secured in high position to illustrate the alternate dispositions.

For securing the supporting leg units in either high or low position the framing pieces 30 and 31 are each further fitted with pivoted latching members 36 and 37 adapted for engaging latching lip elements 38 and 39 secured, respectively, on the hinge anchor block 33 and the adjacent slide member anchor block 34, so that the latching members 37 may be interlocked with lip elements 38 to secure the high level supporting legs or arm portions 28 in standing position, while the latching members 36 may be interlocked with the lip elements 39 to secure the low level supporting legs or arm portions 29 alternatively in standing position.

Figure 6:
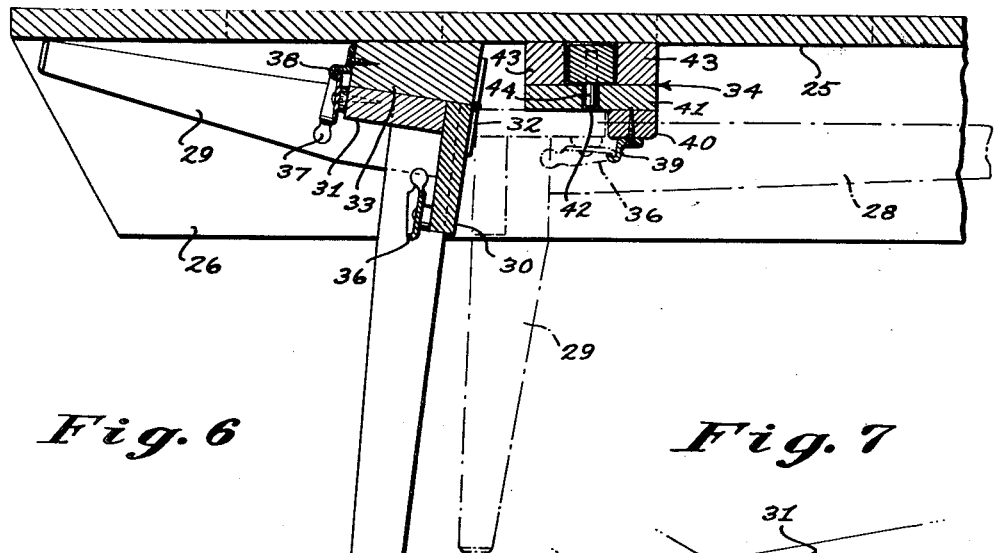
Fig. 6 is a fragmentary longitudinal section of the table illustrated in the preceding views, with the supporting legs shown in full lines arranged in high position and the low position thereof indicated in broken lines.

It should also be noted in this connection that the low level supporting legs 29 are arranged to pivot or swing outwardly toward the ends of table top 25 in retracted position, the point of attachment for the hinges 32 on the anchor block 33 being spaced inwardly from the table ends at a distance at least equal to the length of these supporting legs 29 so that they remain concealed beneath the table top 25 in retracted position. Also, the bottom face of the anchor block 33 is preferably inclined upwardly toward the table top ends, as shown best in Fig. 6, so that the extending ends on the low level supporting legs 29 will rest against the under side of the table top 25 when these legs 29 are retracted and secured, and thereby further stabilize the standing legs 28.

Figure 8:
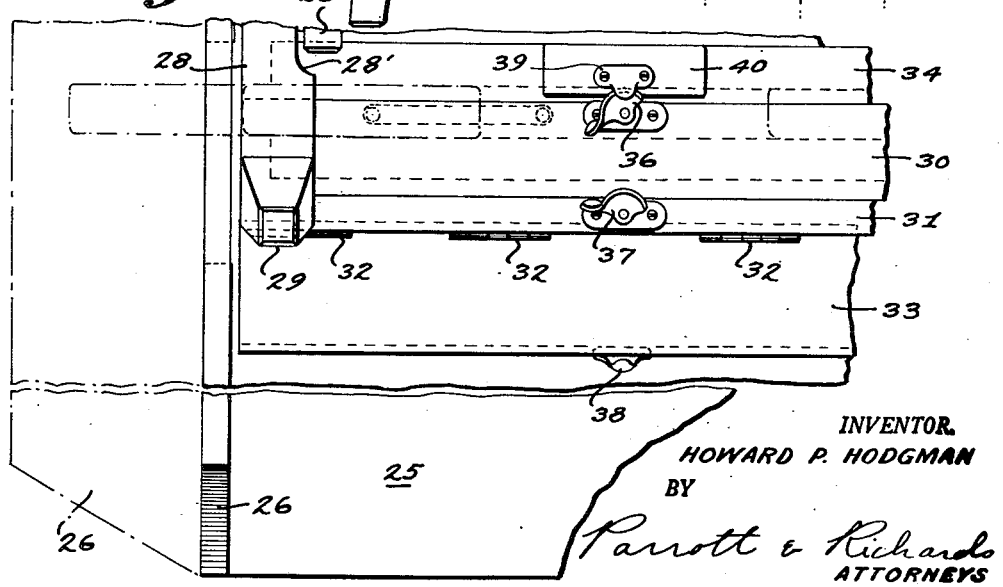
Fig. 8 is a fragmentary plan view generally as seen from the bottom in Fig. 6, but with the supporting legs shown in low position.

Likewise, the high level supporting legs 28 have side face offsets as at 28' for internesting in retracted position with the extending ends thereof resting against the opposite anchor block 34 (compare Fig. 8) when the latching members 36 are engaged with the lip elements 39 on the adjacent anchor block 34. In addition, it should be noted that the supporting leg units might be arranged, if desired, to allow the extending ends of the legs 29 to extend beyond the opposite anchor blocks 34 so as to allow shortening of the length of table top 25, but that the table length should in any event be at least equal to the total length of a set of the high and low level supporting legs taken together.

As to the anchor blocks 34 that are provided for housing the drop leaf supporting slides 35, as previously mentioned, these anchor blocks 34 preferably have a composite structure comprising a shim block 40 for mounting the latching lip element 39 with a proper disposition, a bottom face plate 41 carrying the shim block 40 and formed with a pair of central longitudinal slots 42 spaced in relation to each end thereof, and a pair of spacing blocks 43 carrying the face plate 41 and secured to the under side of the table top 25 to receive the drop leaf slide supports 35 therebetween. The slide members 35 are in turn fitted with dowel pins or the like as at 44 disposed to run in the face plate slots 42, which are formed with a longitudinal reach sufficient to allow proper extension and retraction of the slide members 35, with the dowel pins 44 acting as stop elements at each end of the slots 42 to determine the fully extended or retracted position of the slide members 35. Each slide member 35 is further formed with a suitable hand hold groove 35' or the like at its extending end by which it may be manipulated conveniently for extension or retraction.

The arrangement of the drop leaves 26 and 27 according to the present invention is illustrated in detail in Figs. 9 to 14 of the drawings. It will be seen from the preceding views the side edges of the table top 25 at which the drop leaves 26 and 27 are mounted have rectangular notches 45 formed therein at spaced intervals, and that the adjacent edges of the drop leaves 26 and 27 have similar notches 46 and 47 formed therein in a complementary pattern. All of these notches 45 in the table top 25, and 46 and 47 in the drop leaves 26 and 27, are formed with depth substantially equal to the thickness of the table top 25 (or drop leaves 26 and 27), and the unnotched portions of both the table top and adjacent drop leaf edges are rounded from the upper table top or drop leaf surface inwardly to the bottom thereof on a radius substantially equal to one-half the thickness of the table top 25 (or drop leaves 26 and 27).

The drop leaves 26 and 27 are hinged on the table top 25 with these notches 45, and 46 and 47, internested and the swinging movement thereof centered on an axis coincident with the centers of the above noted rounding radii. This is done by means of hinge assemblies 48 and 48' such as are illustrated in Figs. 13 and 14, which are identical except that the assembly 48 is one hand of hinge and the assembly 48' the other hand. Both assemblies 48 and 48' comprise a first hinge arm 49 or 49', a second hinge arm 50 or 50', and a hinge pin 51 or 51' forming a pivot axis for the assemblies 48 and 48', respectively, both hinge arms of the assemblies being angled intermediately of their length toward their pivot for a purpose that is explained just below. The hinge assemblies 48 and 48' are used, in appropriate positions as to hand, for mounting the drop leaves 26 and 27 on the table top 25 by securing the first hinge arm 49 or 49' at the bottom face of an unnotched portion of the table top 25 adjacent an end of one of the notches 45 therein, and by securing the second hinge arm 50 or 50' at the bottom face of the adjacent unnotched portion of the drop leaf 26 or 27, so that the angled portions of the hinge arms are disposed to place the hinge pin 51 or 51' in alignment with the centers of the previously mentioned rounding radii for table top and drop leaf edges, suitable recesses (not shown) being formed in the bottom faces of the table top 25 and drop leaves 26 and 27 to provide clearance for this disposition of the angled hinge arm portions and the hinge pins 51 or 51'.

The result of this mounting arrangement for the drop leaves 26 and 27 is to provide for bringing them into accurate alignment with the table top 25 in raised position so as to form a continuous table surface that is internested at the mating edges therefor in a manner that assures a flush disposition of the drop leaves 26 and 27 with the table top 25 much more readily than is possible in the conventional drop leaf hinging arrangements heretofore employed. Fig. 9 illustrates the hinging arrangement of the present invention at a section through one of the table top notches 45 with the related drop leaf 26 in raised position, while Fig. 10 is a similar section showing the drop leaf 26 lowered. Figs. 11 and 12 show comparable sections through one of the drop leaf notches 46 at the position of drop leaf support slide 35, with the drop leaf 26 being lowered and the slide member 35 retracted in Fig. 11, while the drop leaf 26 is raised and the slide member 35 is extended in supporting relation in Fig. 12.

The present invention has been described in detail above for purposes of illustration only and is not intended to be limited by that description or otherwise except as defined in the appended claim.

I claim:

A table comprising a fixed table top, a drop leaf mounted at an edge of said table top, said table top edge having rectangular notches formed therein at spaced intervals in a depth substantially equal to the thickness of said table top and having the unnotched portions thereof rounded from the upper table top surface inwardly to the bottom surface on a radius substantially equal to one half the thickness of said table top, the adjacent drop leaf edge being notched in a complementary pattern with the unnotched portions of said adjacent edge similarly rounded inwardly from the top surface to the bottom thereof, and a plurality of hinge assemblies securing said drop leaf at said adjacent edge for swinging movement on said table top edge, said hinge assemblies comprising a first hinge arm secured at the bottom face of an unnotched portion of said table top adjacent an end of one of said notches therein, a second hinge arm secured at the bottom face of the adjacent unnotched portion of said drop leaf, the hinged ends of both of said arms being angled to reach a pivot axis coincident with the centers of said rounding radii and recesses being formed in the bottom faces of said table top and drop leaf to provide clearance for said angled hinge arm ends, and a hinge pin assembling said arms on said pivot axis.

References Cited in the file of this patent

UNITED STATES PATENTS

| Number | Name | Date |
|---|---|---|
| D. 168,508 | Hodgam | Dec. 30, 1952 |
| 1,209,421 | Ferguson | Dec. 19, 1916 |
| 1,489,679 | Thornton | Apr. 8, 1924 |
| 1,625,294 | Whitesides | Apr. 19, 1927 |
| 1,677,393 | Kideney | July 17, 1928 |
| 1,695,110 | Krick | Dec. 11, 1928 |
| 2,210,220 | Soisson | Aug. 6, 1940 |
| 2,329,213 | Neutra et al. | Sept. 14, 1943 |
| 2,358,174 | McFall | Sept. 12, 1944 |
| 2,420,787 | McFall | May 20, 1947 |
| 2,494,275 | Abbott | Jan. 10, 1950 |
| 2,527,505 | Wilkinson, Jr. | Oct. 24, 1950 |
| 2,557,716 | Allee | June 19, 1951 |